United States Patent Office 2,771,497
Patented Nov. 20, 1956

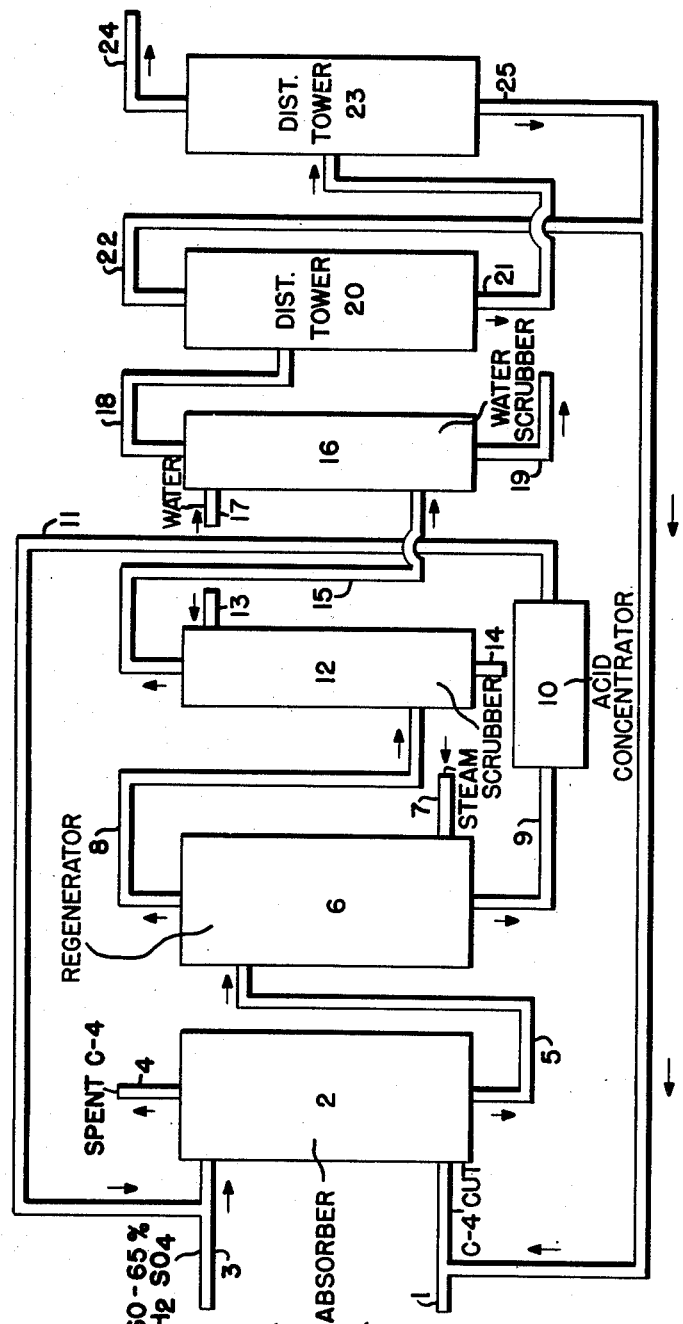

2,771,497

METHOD OF PURIFYING ISOBUTYLENE

John C. Hunt, Linden, Stanley E. Jaros, Watchung, and Joseph F. Nelson, Rahway, N. J., assignors to Esso Research and Engineering Company, a corporation of Delaware Application November 19, 1952, Serial No. 321,328

2 Claims. (Cl. 260—677)

This invention relates to a method for purifying isobutylene and relates more particularly to the purification of this material to prepare it as a suitable feed stock for the polymerization to solid rubbery-like polymers.

It is known to prepare solid rubbery polymers from isobutylene by contacting it with aluminum chloride or boron fluoride at temperatures as low as −140° F. The isobutylene used in this process must be substantially pure. A suitable method for obtaining isobutylene comprises contacting a hydrocarbon stream, suitably a stream containing largely $C_4$ hydrocarbons, including isobutylene, with 50–65% sulfuric acid to absorb only the isobutylene. Gentle heating of the acid-isobutylene solution causes the isobutylene to be polymerized to the dimer and trimer of isobutylene. These can be easily separated from the acid and cracked back to highly purified isobutylene. However, in addition to undesirable n-butenes, the product when extracted from certain refinery $C_4$ streams contains a very small amount of mercaptans as impurities. This small amount (for example copper number of 4 to 6) is sufficient to severely poison the polymerization reaction, preventing the production of high molecular weight polyisobutylene.

It is possible to remove the mercaptan impurities by a number of so-called "sweetening" processes. It was found, for example, that the well known "Doctor Sweetening Process" was effective in reducing the sulfur content of the isobutylene to a level satisfactory for polymerization to high molecular weight polyisobutylene. Such a process, however, despite its wide use is not a convenient process to operate, even when operated as a continuous unit. The numerous settling drums required in the treating and the necessity of regenerating the doctor solution make the process unadaptable to complete automatic control.

It is also general practice in chemical refining to remove acid impurities such as hydrogen sulfide, sulfur dioxide, sulfur trioxide, low molecular weight mercaptans, organic acids and phenols from petroleum fractions by treatment with alkaline reagents such as sodium hydroxide, sodium carbonate, calcium oxide, and potassium hydroxide. In the case of the lower molecular weight mercaptans it is generally considered that for most purposes they can be effectively removed by treatment with a large excess of aqueous caustic soda. The reaction proceeds according to the following equation:

$$RSH + NaOH \rightarrow RSNa + H_2O$$

The degree of completion of the reaction depends on the "R" group, being essentially complete for methyl mercaptan and ranging downward to 63% complete for the butyl mercaptan and 33% complete for the amyl mercaptan.

It has been found, however, that the polymerization of isobutylene to high molecular weight solid rubbery-like polymers is so sensitive to the presence of mercaptans that caustic treating will not remove from the isobutylene sufficient of even the more reactive methyl mercaptan to permit polymerization to a high molecular weight material. Caustic treating is, therefore, by itself not a satisfactory method of removing the mercaptan impurities from isobutylene.

It would appear from examining the boiling points involved that isobutylene with an atmospheric boiling point of −6° C. could be separated by distillation from the lowest boiling mercaptan, methyl mercaptan, which has at atmospheric boiling point of 6° C. On distillation of the impure isobutylene to remove pure isobutylene over head leaving the mercaptan impurities in the bottom it was found that the separation between methyl mercaptan and isobutylene could not be made. The distilled isobutylene contained sufficient impurities to poison its polymerization to a high molecular weight polyisobutylene. Further investigation disclosed that methyl mercaptan forms a minimum boiling azeotrope with isobutylene, a phenomena not previously disclosed in the literature.

The present invention utilizes the discovery of the methyl mercaptan isobutylene azeotrope to afford a simple, easy, and economically advantageous method of removing mercaptans from the isobutylene.

To the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Referring now to the drawing, a C–4 cut having the following typical hydrocarbon composition:

| | Percent by volume |
|---|---|
| Propane | 0.0 |
| Isobutane | 18.7 |
| n-Butane | 46.7 |
| Isobutylene | 11.9 |
| Butene-1 | 9.2 |
| Cis butene-2 | 3.8 |
| Trans butene-2 | 5.8 |
| Butadiene | 0.4 |
| C5+ | 3.5 | is fed by line 1 to the bottom of absorption tower 2, into which sulfuric acid of about 60–65% strength is introduced through line 3. The acid contacts the C–4 cut in countercurrent at a temperature of 70–100° C. and absorbs the isobutylene present largely to the exclusion of normal butylenes. Unabsorbed hydrocarbons are removed through line 4, while sulfuric acid containing absorbed isobutylene is withdrawn through line 5 and passed to regenerator 6. The regenerator is suitably any conventional type of tower, but is preferably a packed tower filled with Raschig rings, Berl saddles and the like.

In tower 6 steam is added by line 7 and the temperature is maintained at about 250° C. A mixture of isobutyl alcohol and isobutylene is withdrawn overhead through line 8 and weak acid of 45% strength is withdrawn through line 9. The acid is reconcentrated to 65% strength in concentrator 10 and recycled to tower 2 through line 11. The mixture of isobutylene and isobutyl alcohol is passed by line 8 to caustic scrubber 12, where it is contacted with sufficient caustic, introduced through line 13, to neutralize any residual acid present. Spent caustic is removed through line 14. Acid-free isobutylene and isobutyl alcohol are passed by line 15 to water scrubber 16 where they are contacted with water introduced through line 17 to separate the alcohol and polymeric isobutylene from the monomeric isobutylene. The isobutylene is withdrawn overhead through line 18 and aqueous alcohol and polymer is withdrawn through line 19. This isobutylene stream, although relatively pure, contains mercaptans and n-butenes as impurities which make it unsatisfactory for polymerization to high molecular weight polyisobutylene.

In accordance with the present invention, the isobutylene is passed by line 18 to distillation tower 20 where the isobutylene is distilled to remove overhead a mixture of isobutylene and methyl mercaptan approaching in composition the isobutylene-methyl mercaptan azeotrope. This azeotrope boils at 53° C. and has the composition 78 mol percent isobutylene, 22 mol percent methyl mercaptan, at 95 p. s. i. absolute. An essentially mercaptan-free isobutylene is withdrawn through line 21. The isobutylene-mercaptan distillate is recycled by line 22 to the absorption tower 2, where contact with the extracting acid reduces the mercaptan content to that of the stream leaving the tower through line 5. The bottoms from tower 20 now consisting of isobutylene with butene-2, butene-1, and higher molecular weight mercaptans as impurities is withdrawn through line 21 and charged to tower 23. Polymerization grade isobutylene is withdrawn overhead through line 24. The bottoms from tower 23 is withdrawn through line 25 and recycled to the absorption tower 2.

The advantages of the invention will be better understood from a consideration of the following experimental data which are given for the sake of illustration, but without intention of limiting the invention thereto.

Example 1

Isobutylene recovered from the isobutylene extraction section, i. e. line 18, figure 1, is scrubbed with a caustic solution and charged to the still of a laboratory distillation unit whose column consists of a packed section containing eighteen theoretical plates. A distillation was carried out at 85 p. s. i. g. with a reflux ratio of 11:1. The overhead product was taken in succeeding fractions and each fraction tested for satisfactory purity by polymerizing the isobutylene in the known manner. The following table gives the experimental results.

| Overhead Cut No. | Vol. Percent of Feed | Polyisobutylene Product, Molecular Weight |
|---|---|---|
| 1 | 5.6 | 70,100. |
| 2 | 4.5 | 107,000. |
| 3 | 5.3 | 115,800. |
| 4 | 5.0 | 123,600. |
| 5 | 5.2 | 126,600. |
| 6 | 5.3 | 124,500. |
| Bottoms | 66.1 | Very low. |

The quality of the isobutylene brought over in the third and subsequent cuts was excellent as judged by the molecular weight of the polyisobutylene produced indicating that after the first two cuts containing the azeotroping methyl mercaptan, the isobutylene taken overhead is sufficiently pure to give the desired high molecular weight polyisobutylene. Before fractionation the impure isobutylene when polymerized produced a polymer of 7500 molecular weight.

The nature of the present invention having been thus fully set forth and specific examples of the same given, what is claimed as new and useful and desired to be secured by Letters Patent is:

1. In a process for the preparation of pure isobutylene suitable for the preparation of solid polymers wherein an isobutylene stream containing methyl mercaptan is absorbed in about 65% sulfuric acid at a temperature of 70–100° C. to produce an acid extract and wherein isobutylene is regenerated from the acid extract by heating it to a temperature of about 250° C. in the presence of water, whereby isobutylene containing small amounts of methyl mercaptan is obtained, the improvement which comprises distilling the isobutylene stream in a first distillation zone to remove overhead the methyl mercaptan as an isobutylene-methyl mercaptan distillate by virtue of its property of forming a minimum boiling azeotrope with isobutylene and a methyl mercaptan free bottoms, recycling the distillate to the acid absorption step.

2. In a process for the preparation of pure isobutylene suitable for the preparation of solid polymers wherein an isobutylene stream containing methyl mercaptan and higher boiling impurities is absorbed in about 65% sulfuric acid at a temperature of 70–100° C. to produce an acid extract and wherein isobutylene is regenerated from the acid extract by heating it to a temperature of about 250° C. in the presence of water, whereby isobutylene containing small amounts of methyl mercaptan and higher boiling impurities is obtained, the improvement which comprises distilling the isobutylene stream in a first distillation zone to remove overhead the methyl mercaptan as an isobutylene-methyl mercaptan distillate by virtue of its property of forming a minimum boiling azeotrope with isobutylene and a methyl mercaptan-free bottoms, recycling the distillate to the acid absorption step, passing the methyl mercaptan free isobutylene to a second distillation zone to separate overhead essentially pure isobutylene as the distillate and a bottoms containing the higher boiling impurities and recycling the bottoms to the acid absorption zone.

References Cited in the file of this patent

UNITED STATES PATENTS

| | | |
|---|---|---|
| 2,236,723 | Yabroff et al. | Apr. 1, 1941 |
| 2,281,911 | Bannon et al. | Feb. 16, 1943 |
| 2,309,653 | Leum et al. | Feb. 2, 1943 |
| 2,433,030 | Cone | Dec. 23, 1947 |
| 2,581,065 | Arnold | Jan. 1, 1952 |

OTHER REFERENCES

Horsley et al.: "Azeotropic Data," published June 1952, American Chemical Society, 1155—16th St. N.W., Washington, D. C., p. 31.